March 29, 1966  F. T. IRGENS  3,242,761
CABLE ACTUATING DEVICE
Filed May 27, 1963  3 Sheets-Sheet 2

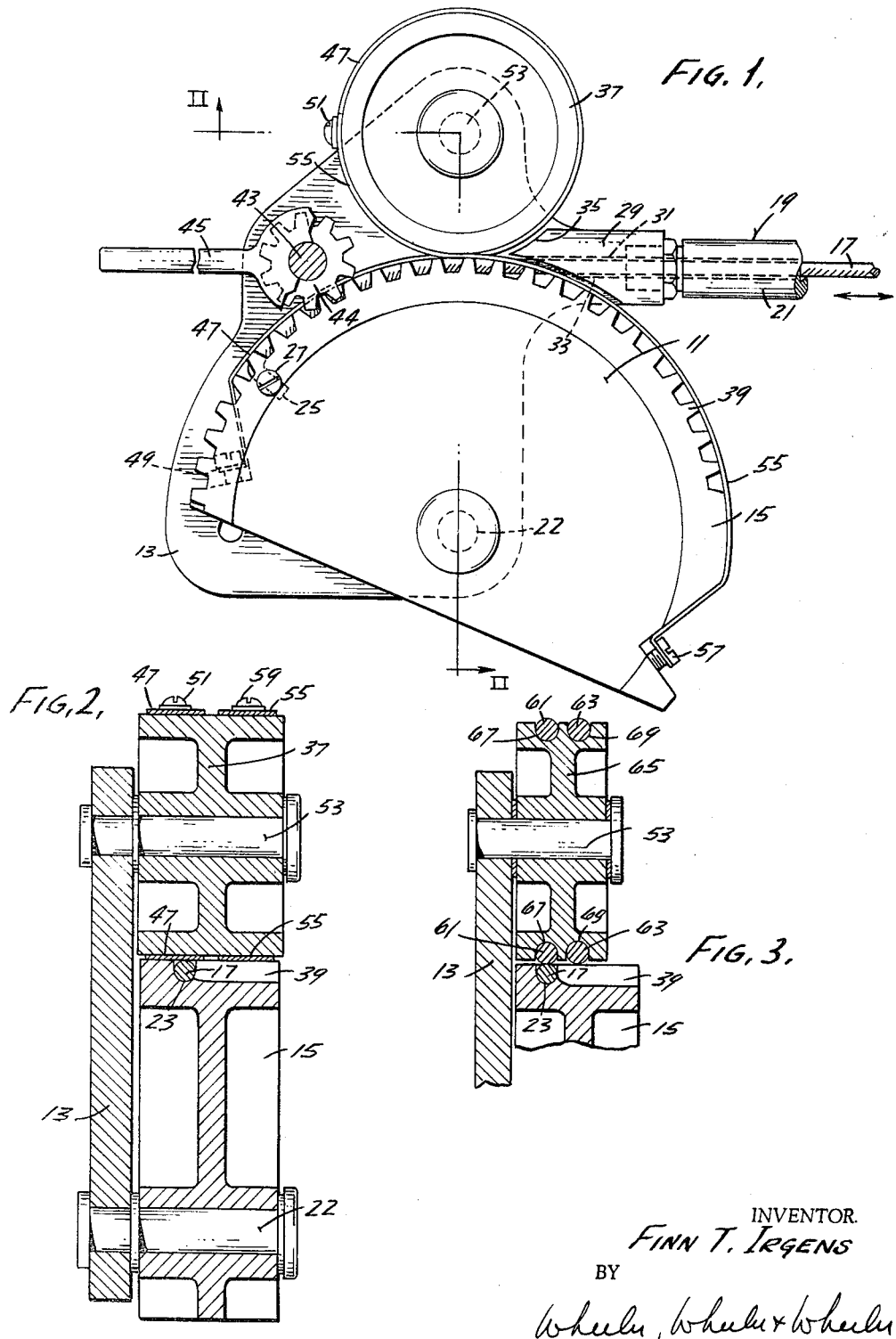

INVENTOR.
FINN T. IRGENS
BY
Wheeler, Wheeler & Wheeler
ATTORNEYS.

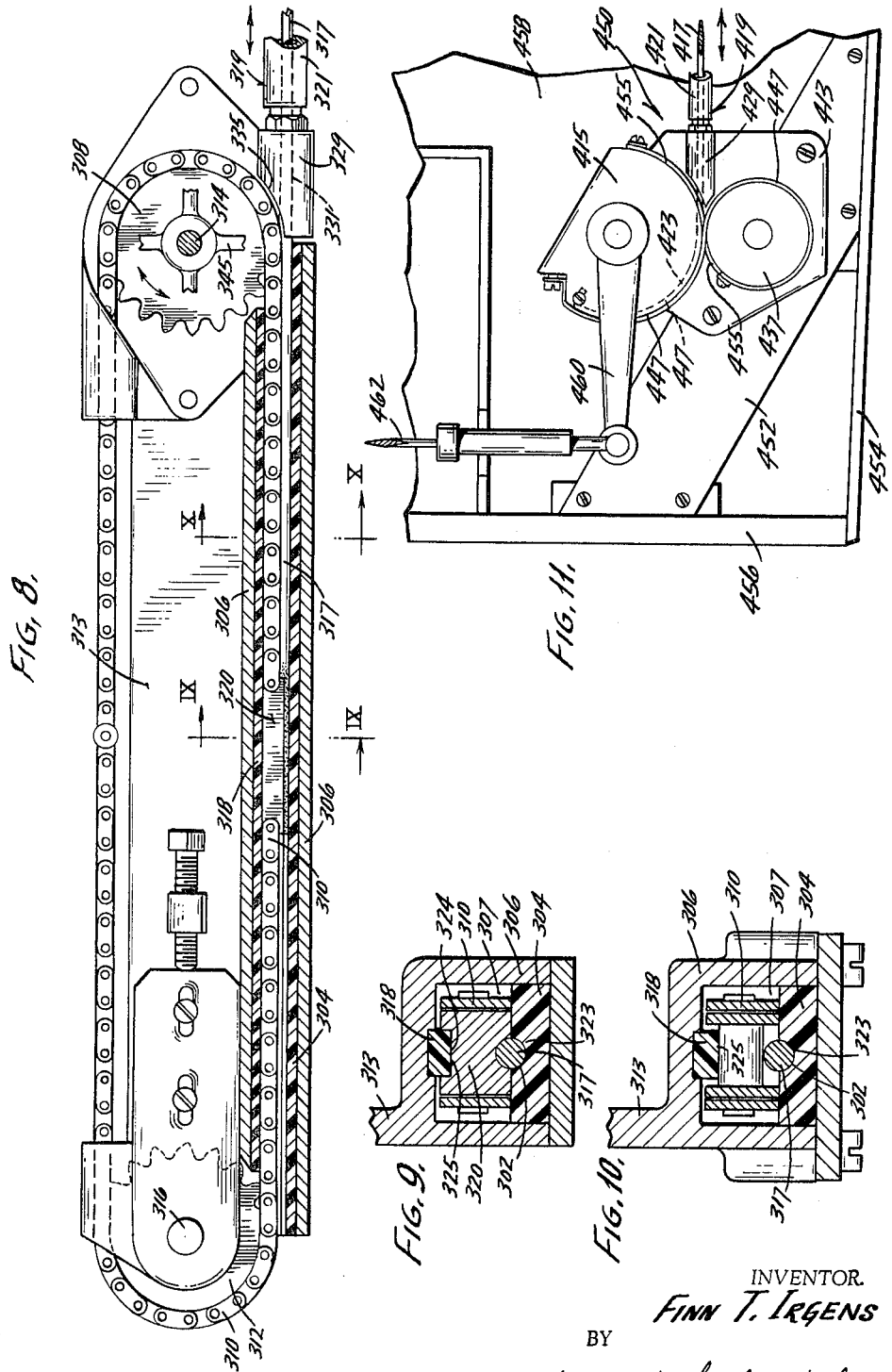

United States Patent Office 3,242,761
Patented Mar. 29, 1966

3,242,761
CABLE ACTUATING DEVICE
Finn T. Irgens, Milwaukee, Wis., assignor to Outboard Marine Corporation, Waukegan, Ill., a corporation of Delaware
Filed May 27, 1963, Ser. No. 283,223
21 Claims. (Cl. 74—501)

The invention relates generally to actuating mechanisms or devices for flexible push-pull cables. More specifically, the invention relates to push-pull flexible cables including an outer sheath or guide tube and an axially displaceable core disposed partially within said sheath and partially in engagement with a way extending from the end or entrance of the sheath for the storage of the exterior portion of the core.

In the past, considerable difficulty has been encountered in pushing a flexible cable core into the end of a confining sheath without experiencing buckling of the portion of the cable core disposed exteriorly of the sheath. The invention is directed to a mechanism or arrangement for effectively axially delivering and withdrawing a flexible push-pull cable core into and from its sheath or guide tube in a manner eliminating such buckling as has commonly occurred in the past.

The invention provides support at a point in intermediate proximity to the sheath for confining the cable core against buckling and constraining it to move rectilinearly into the sheath. More particularly, the invention provides an arrangement including core confining means movable relative to a core confining position on or in a way and means for displacing said confining means relative to the way in the area immediately adjacent to the entrance of the sheath in accordance with the displacement of the cable core relative to the sheath.

In one embodiment wherein the way is disposed on a rotatable drum, the confining means takes the form of a flexible, inelastic, elongated member, such as a strap, belt, or chain, which is movable along a path extending along the way in core-confining disposition to a point immediately adjacent to the entrance of the sheath into which the core is delivered. The confining member is progressively displaced relative to its core-confining disposition by means comprising a guide, pulley, or sprocket about which the confining member is trained, and by means for effecting travel of the confining member around the guide, pulley, or sprocket in accordance with the delivery or withdrawal of the core into or from the sheath. As will be disclosed hereinafter, various arrangements can be employed to effect travel of the confining member around the guide, pulley, or sprocket in accordance with axial displacement of the cable core within the sheath.

In another embodiment, a substantially rectilinear, stationary way is employed with a sheath extending from one end of the way. Movable along a path extending, in part, in core-confining relation to the way and, in part, away from the way at a point adjacent to the sheath entrance, is a confining member, such as a chain or strap, to which is connected the end of the cable core disposed exteriorly of the sheath. Means are provided for displacing the confining member along said path whereby to effect a pushing of the cable core axially of the sheath while preventing buckling of the core during advancement thereof into the sheath.

Thus, in each of the embodiments there is provided core-confining means which, at all times and during movement of the core, extends from immediately adjacent the sheath entrance along the core storage way, thereby preventing buckling of the core with respect to the way during movement of the core relative to the way.

Other objects and advantages of the invention will become known by reference to the following description and accompanying drawings of several embodiments of the invention.

In the drawings:

FIGURE 1 is a plan view of one embodiment of a control cable actuating device incorporating various of the features of the invention;

FIGURE 2 is a sectional view taken generally along line 2—2 of FIGURE 1;

FIGURE 3 is a fragmentary sectional view similar to FIGURE 2 showing a modified form of the invention;

FIGURE 8 is a plan view of a fifth embodiment of a control cable actuating device incorporating various of the features of the invention;

FIGURE 9 is an enlarged fragmentary sectional view taken along line 9—9 of FIGURE 8;

FIGURE 10 is an enlarged fragmentary sectional view taken along line 10—10 of FIGURE 8; and FIGURE 11 is a fragmentary plan view of another device incorporating various of the features of the invention.

Figure 4:
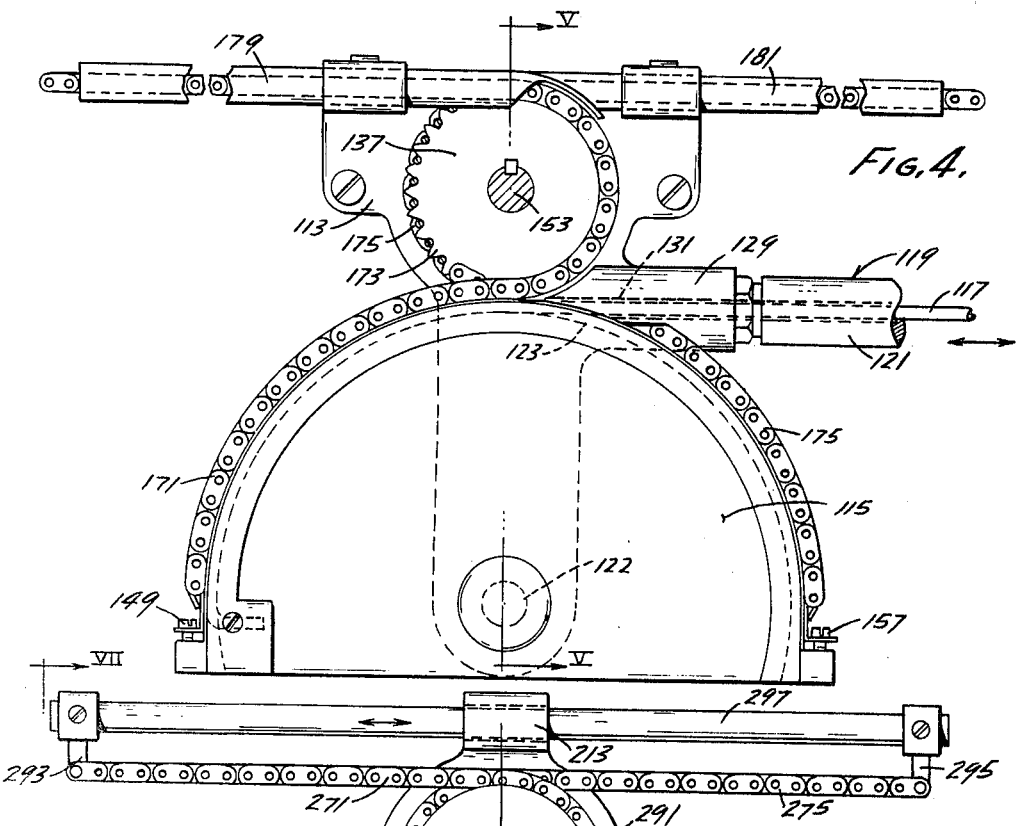
FIGURE 4 is a plan view of a third embodiment of a control cable actuating device incorporating various of the features of the invention.

In FIGURES 1 and 2 there is shown a control cable actuating device 11 including a supporting frame or bracket 13 rotatably mounting a drum 15 which has fixedly connected thereto one end of the core 17 of a conventional push-pull cable 19. In addition to the core 17, the push-pull cable 19 also includes an outer sheath 21 in which the core 17 is axially displaceable. Rotation of the drum 15 serves, as will be seen, to either axially retract the core 17 from the enclosing sheath 21, or to axially displace the core 17 into the sheath 21.

In plan view, the drum 15 generally constitutes a segment of a circuit and is rotatably mounted on a stud 22 carried by the bracket 13. On its circular outer periphery, the drum 15 includes a recessed way 23 which receives the cable core 17 and which has a depth corresponding generally to the diameter of the core. Various means, such as for example, the illustrated radial socket 25 and set screw 27, can be employed to anchor the cable core to the drum 15 and in the way 23.

Also carried by the bracket 13 in adjacent relation to the drum 15 is a sheath extension part 29 which is connected to the sheath 21 and which includes a bore 31 extending tangentially to the way 23 to provide a passage through which the cable core 17 extends between the way 23 and the sheath 21. Adjacent to the drum, the sheath extension part 29 is arcuately formed, as shown at 33, so as to lie in adjacent relation to the periphery of the drum 15. The sheath extension part 29 is also arcuately formed, as indicated at 35, to provide clearance for a pulley 37 still to be described.

The drum 15 can be rotated by various means. In the embodiment illustrated in FIGURES 1 and 2, the drum rotating means comprises a gear segment 39 formed on the arcuate periphery of the drum 15 and a meshing pinion 44 carried on a shaft 43 rotatably supported, at least in part, by the bracket 13. The shaft 43 can be rotated by various means, such as for instance, by affixing thereto a handle or wheel 45.

In order to prevent buckling or displacement of the core 17 out of the way 23, particularly when the drum 15 is rotated in a clockwise direction as seen in FIGURE 1, so as to axially displace the core 17 into the sheath 21, means are provided for confining the core 17 in the way 23. Such means takes the form of a flexible member and means for locating the flexible member in core-confining position in overlying relation to the way and for progressively displacing the flexible member relative to its position in overlying relation to the way in accordance with angular movement of the drum 15.

In the embodiment shown in FIGURES 1 and 2, the flexible member comprises a belt 47 which is anchored, at one end, by suitable means such as the screw 49 to the drum 15 at a point beyond and adjacent to the anchored end of the cable core 17. The belt locating and progressive displacing means comprises the before-mentioned pulley 37 around which the belt 47 is reversely trained and to which the other end of the belt 47 is anchored by suitable means indicated at 51. The pulley 37 is rotatably mounted in tangential relation to the drum 15 immediately adjacent to the sheath extension part 35 on a stud 53 extending from the frame 13. Rotation of the drum 15 in the counterclockwise direction, as seen in FIGURE 1, therefor serves to withdraw the core 17 from the sheath 21 and to rotate the pulley 37 in the clockwise direction, thereby progressively laying the belt 47 in overlying relation to the way 23.

The belt locating and progressive displacement means also incorporates means for rotating the pulley 37 in a counterclockwise direction as seen in FIGURE 1 so as to progressively withdraw the belt 47 from core-confining disposition in overlying relation to the way 23 when the drum 15 is rotated in the clockwise direction to insert the core 17 into the sheath 21. Such means should be effective to rotate the pulley 37 with a peripheral speed the same as the peripheral speed of the drum 15. In the embodiment disclosed in FIGURES 1 and 2, such means takes the form of an auxiliary belt 55 which is trained in S shape around the pulley 37 and the drum 15 in the opposite sense from the disposition of the belt 47 and which lies on the pulley 37 in laterally adjacent relation to the belt 47. At its ends, the belt 55 is anchored to the drum 15 and the pulley 37 as shown respectively at 57 and 59. One of the connections is desirably a tension take-up. As a consequence of the above arrangement and in response to rotation of the drum 15, the core 17 is either progressively covered or uncovered by the confining belt 47 at the point of tangency between the pulley 37 and the drum 15 immediately next to the adjacent end of the sheath extension part 29.

The modification shown in FIGURE 3 is generally identical to the device disclosed in FIGURES 1 and 2, except that a pair of cables 61 and 63 are respectively employed in place of belts 47 and 55 and a pulley 65, with a pair of annular recesses 67 and 69 receiving the cables, is employed in place of the pulley 37.

Figure 5:
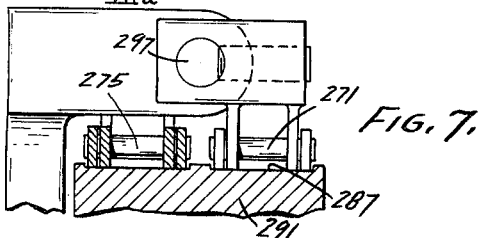
FIGURE 5 is a sectional view taken generally along line 5—5 of FIGURE 4.

In the embodiment shown in FIGURES 4 and 5, a drum 115 is rotatably mounted on a stud 122 on a supporting frame or bracket 113 and has fixedly connected thereto one end of a core 117 of a conventional push-pull cable 119. Also carried by the bracket 113 in adjacent, tangentially extending relation to the drum 115 is a sheath extension part 129 which is connected to the sheath 121 of the push-pull cable 119. The sheath extension part 129 includes a bore 131 which extends tangentially to the core receiving way 123 in the drum 115 to provide an entrance or passage through which the cable core 117 extends between the way 123 and the sheath 121.

In the embodiment shown in FIGURES 4 and 5, a flexible link chain 171 serves both as one component of a core-confining means and as one component of means for rotating the drum 115. More specifically, the link chain 171 is anchored at one end to the drum at 149 and is wound around a sprocket 173 on a sprocket wheel 137 which is tangentially located with respect to the drum 115 and which is mounted on a shaft 153 journaled, at least in part, in the bracket 113. Connected to the shaft 153 is a handle or wheel 145 by means on which the sprocket 137 can be rotated.

Accordingly, rotation of the sprocket wheel 137 in the counterclockwise direction, as seen in FIGURE 4, serves to rotate the drum 115 in the clockwise direction so as to axially displace the core 117 inwardly of the sheath 121. Such movement of the sprocket wheel 137 also serves to progressively remove the link chain 171 from its core confining relation to the way 123 at the point where the core 117 passes from the way 123 into the bore 131 in the sheath extension part 129.

In order to obtain counterclockwise rotation of the drum 115 in response to clockwise rotation of the sprocket wheel 137, a second link chain 175 is anchored at one end to the drum 115 at 157 and is trained in S-shape around the drum 115 and around a second sprocket 177 on the sprocket wheel 137 in reverse relation to the link chain 171.

In order to prevent interference with the operation of the device, means are provided for storing the free end portions of the link chains 171 and 175. In the embodiment shown in FIGURES 4 and 5, such means takes the form of a pair of oppositely extending chain tubes 179 and 181 which are supported by the bracket 113 in adjacent parallel relation to each other.

Figure 6:
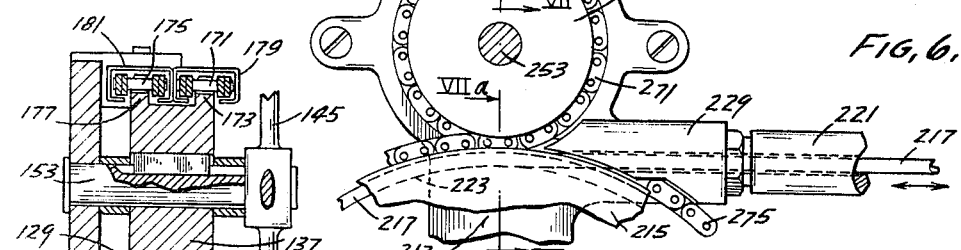
FIGURE 6 is a fragmentary plan view of a fourth embodiment of a control cable actuating device incorporating various of the features of the invention.
Figure 7:
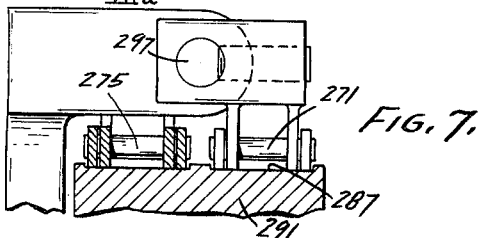
FIGURE 7 is a fragmentary sectional view taken generally along line 7—7 of FIGURE 6.
Figure 7A:
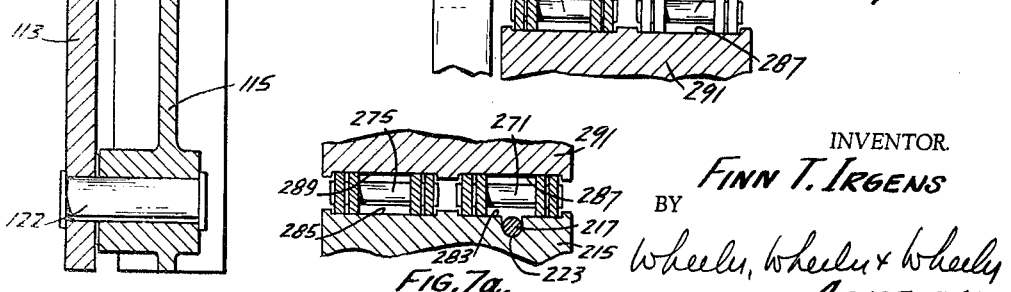
FIGURE 7a is a fragmentary sectional view taken generally along line 7a—7a of FIGURE 6.

The embodiment shown in FIGURES 6 and 7 is generally similar to the embodiment shown in FIGURES 4 and 5, except as hereinafter mentioned. In this regard, the chains 271 and 275 are trained in respective guideways 283 and 285 around the drum 215 and in respective guideways 287 and 289 in a guide member 291 located in tangential relation to the drum 215 adjacent to the sheath extension part 229. While the guide member 291 could be fixed, in the specifically illustrated construction, the guide member 291 comprises a pulley or idler wheel rotatably mounted on a shaft 253, extending from a supporting bracket 213. One end of each of the chains 271 and 275 is anchored to the drum 215 and, at their other ends, the chains 271 and 275 are respectively anchored, as shown at 293 and 295, to an elongated rectilinear bar 297 which is slideably journalled by the bracket 213. As the chains are connected to the bar so as to remove any slack, rotation of the drum 215 is effective to either progressively locate the link chain 271 in core confining covering relation to the way 223 or to progressively withdraw the chain 271 from its covering relation to the way 223.

In the embodiment shown in FIGURES 6 and 7, means separate from the idler wheel 291 are employed to rotate the drum 215. Such means can take the form of a pinion, such as the pinion 41 shown in FIGURE 1, which pinion is meshed with a gear formation on the drum, also as shown in FIGURE 1, and which pinion is rotatable by a handle such as the handle 45 shown in FIGURE 1.

In the embodiment shown in FIGURES 8, 9, and 10, the core receiving way 323 constitutes a rectilinearly elongated, semi-cylindrical recess 302 in a rectilinear generally stationary drum or guide member 304 supported in an enclosed subframe 306 which forms a channel 307 and which constitutes one portion of a supporting bracket or frame 313. Located on the frame 313 at one end of the way 323 is a sheath extension part 329 which is connected to the sheath 321 of a cable 319 and which includes a central bore 331 extending from immediately adjacent the way 323 for passage of the cable core 317 between the way 323 and the sheath 321. At its end adjacent to the way 323, the extension part 329 defines a curved surface 335 in adjacent relation to a sprocket 308 still to be described. In the specific embodiment, shown in FIGURES 8, 9, and 10, the guide member 304 is fabricated of a relatively rigid material such as hard rubber or plastic.

Confining the core 317 in the way 323 is an endless flexible member which is supported with one run in adjacent overlying relation to the way 323 and means for maintaining the flexible member in engagement with the guide member 304 during travel along said run. In the embodiment shown in FIGURES 8, 9, and 10, the member constitutes a link chain 310 which is trained around the sprocket 308 and a second sprocket 312, both of which are located in tangential relation to the way 323. The sprockets 308 and 312 are respectively carried on shafts 314 and 316 which are rotatably mounted on the frame 313.

The means maintaining the link chain 310 in engagement with the guide way 304 in overlying relation to the way 323 constitutes an elongated bar or guide member 318 supported by the subframe 306 in parallel relation to the way 323 and in engagement with the inner side of the link chain 310. Movement of the link chain 310 along the way 323 and away from the way 323 adjacent to the sheath extension part 329 can be provided by various ways. In the disclosed construction, such means takes the form of a handle or wheel 345 mounted on the shaft 314.

Whereas in the other embodiments the cable and the cable confining member were both anchored to the drum and therefor anchored to each other, in the embodiment shown in FIGURES 8, 9, and 10, one end of the cable core 317 is directly anchored to the cable-confining link chain 310. Such connection is provided by anchoring the cable core 317 to an elongated block 320 which constitutes a part of the link chain 310. The block 320 is dimensioned so that one pair of opposite sides are respectively engaged by the bar 318 and by the guide member 304. More particularly, the block 320 and the bar 318 are slideably engaged by a tongue and groove connection including, in the block 320, a groove or socket 324 receiving a portion or tongue 325 of the bar 318. The tongue 325 is in sliding engagement along each of the opposing side and bottom walls of the groove 324. Consequently, angular shifting of the block 320 during travel along the way 323 is prevented. This feature is particularly important in preventing rupture of the cable core 317 from the block 320 due to fatigue in the cable core which would otherwise occur if angular movement of the block 320 relative to the way 323 was possible.

In the embodiments shown in FIGURES 1–7a, the core and core confining means are both connected to respective drums, specifically drums 15 and 115, thus the drums can be considered as means connecting the core to the core confining means. In the embodiments shown in FIGURES 8–11, the core and core confining means are connected to the block 320, thus the block can be considered as means connecting the core to the core confining means.

In FIGURE 11, various of the features of the invention are embodied in a device 450 adapted for generating an output in response to axial movement of the core 417 of a control cable 419. While various applications are possible, the device 450 constitutes one part of a steering control system for an outboard motor (not shown) and is mounted on a supporting plank or beam 452 extending diagonally between the respective side and transom walls 454 and 456 of a boat hull 458. The cable 419 is connected, at one end, to an actuating device, such as the device shown in FIGURES 1 through 10, operable by a steering wheel to effect axial displacement of the cable core 417 and, at its other end, to the device 450.

The device 450 includes a mounting frame 413 rotatably supporting, in tangential relation to each other, a drum 415 and an idler pulley 437. Also supported by the frame 413 is a sheath extension part 429 which is connected to the sheath 421 of the control cable 419 and which extends from adjacent to the bite between the drum 415 and the pulley 437.

The drum 415 includes a way 423 in which one end of the cable core 417 is anchored. Also connected to the drum 415 adjacent to the anchored end of the cable core 417 is one end of a first flexible member 447 which extends in an S-shape around a portion of the periphery of the drum 415 in covering relation to the way 423 and around a portion of the periphery of the pulley 437, being anchored thereto at its other end. A second endless member 455 is anchored at one end to the pulley 437, is trained around the pulley 437 and the drum 415 in reverse relation to the endless member 447, and is anchored, at its other end, to the drum 415. Accordingly, axial displacement of the cable core 417 will cause movement of the cable core 417 relative to the way 423 and progressive superpositioning of the endless member 447 relative to the way 423 so as to retain the core 417 in the way 423, together with consequent related rotation of the drum 415 and the pulley 437.

While various arrangements can be used to utilize the rotary movement of one or both of the drum 415 and the pulley 437 for generation of an output, in the construction disclosed in FIGURE 11, the drum 415 has connected thereto a lever or arm 460. At its outer end, the lever 460 is connected to the end of a cable 462 which, at its other end, is connected to an outboard motor (not shown) in such manner that axial displacement of the cable 462 causes steering movement of the lower unit of the outboard motor.

Various of the features of the invention are set forth in the following claims.

What is claimed is:

1. The combination of support means, a way mounted on said support means, a sheath having an entrance opening, means on said support means mounting said sheath in extending relation from said way with said entrance opening in adjacent relation to said way, an elongated push-pull cable core partially engaged in said way and extending into said sheath for lengthwise displacement therein, means for lengthwise displacement of said core relative to said sheath, elongated means extending lengthwise from adjacent said entrance opening of said sheath in adjacent relation to said way for confining said core in engaged relation to said way, said confining means being displaceable relative to said core confining disposition adjacent to said way, and means adjacent to said entrance opening of said sheath and connected to said core displacing means for progressively displacing said core confining means from its core confining disposition in adjacent relation to said way at a point adjacent to said entrance opening in response to displacement of said core which is effective to advance said core into said sheath.

2. The combination of support means, a drum having a way, means on said support means mounting said drum for rotation, a sheath having an entrance opening, means on said support means mounting said sheath in tangentially extending relation from said drum with said entrance opening in adjacent relation to said way, a push-pull cable core anchored to said way, at least partially engaged with said way, and extending into said sheath for lengthwise displacement therein, means on said support for rotating said drum to displace said core lengthwise within said sheath, elongated means extending lengthwise from adjacent said entrance opening of said sheath in adjacent relation to said way for confining said core in engagement with said way, said confining means being displaceable relative to its core confining disposition in adjacent relation to said way, and means on said support means adjacent to said entrance opening of said sheath for displacing said core confining means from its core confining disposition in adjacent relation to said way at the point of entry of said core into said sheath, in response to such rotation of said drum as is effective to push said core into said sheath, and to its core confining disposition in adjacent relation to said way at the point of withdrawal of said core from said sheath, in response to such rotation of said drum as is effective to pull said core from said sheath.

3. A combination in accordance with claim 2 wherein said core confining means comprises a flexible member fixed at one end for movement with said drum, and said means for displacing and returning said core confining means comprises an arcuate guide mounted tangent to said drum at the point of tangency of said sheath, and means for effecting travel of said flexible member around said guide at a rate corresponding to the rate of displacement of said core in response to movement of said drum.

4. A combination in accordance with claim 3 wherein said arcuate guide comprises a circular member and said means for effecting travel of said flexible member around said guide comprises a bar reciprocably mounted on said support means in generally tangential relation to said circular member, means fixedly connecting the other end of said first-mentioned flexible member to one end of said bar, and a second flexible member fixed at one end to said drum, extending around said drum and said circular member in the opposite direction from said first-mentioned flexible member, and fixed at its other end to the other end of said bar.

5. A combination in accordance with claim 4 wherein said circular member is rotatably mounted.

6. A combination in accordance with claim 3 wherein said flexible member comprises a strap, said arcuate guide comprises a rotatably mounted pulley, and said means for effecting travel of said flexible member around said guide comprises a fixed connection between said strap and said pulley, whereby said pulley is rotatable in one direction in response to such rotation of said drum as is effective to pull said core from said sheath, and means connecting said pulley and said drum for rotating said pulley in the opposite direction in response to rotation of said drum in the direction which is effective to push said core into said sheath.

7. A combination in accordance with claim 6 wherein said means for rotating said pulley in the opposite direction comprises a second strap fixed to said drum and to said pulley and extending around said drum and said pulley in the opposite direction from said core confining strap.

8. A combination in accordance with claim 3 wherein said flexible member comprises a chain, said arcuate guide comprises a rotatably mounted sprocket, said means for effecting travel of said flexible member around said guide comprises engagement of said sprocket with said chain whereby said sprocket is rotatable in one direction in response to such rotation of said drum as is effective to pull said core from said sheath, and means connecting said sprocket and said drum for rotation of said sprocket in the opposite direction in response to such rotation of said drum as is effective to push said core into said sheath.

9. A combination in accordance with claim 8 wherein said means for rotating said sprocket in the opposite direction comprises a second chain fixed at one end to said drum and extending around said drum in the opposite direction from said core confining chain and around said sprocket in engagement therewith in the opposite direction from said core confining chain, and guide tubes on said support means for guiding the travel of and storing the free ends of said chains.

10. The combination of support means, a stationary way mounted on said support means, an elongated sheath having an entrance opening, means on said support means mounting said sheath in extending relation from said way with said entrance opening in adjacent relation to one end of said way, an elongated push-pull cable core extending partially in said sheath and having an end portion extending from said sheath in engagement with said way, means on said support means defining a path including a first portion extending in adjacent relation to said way from adjacent said sheath entrance opening and a second portion extending from said sheath entrance opening away from said way, means movable on said path for confining said core in engagement with said way when disposed in said first path portion, means fixedly connecting the end of said core portion engaged with said way to said core confining means, and means for displacing said core confining means along said path to effect lengthwise displacement of said core within said sheath.

11. The combination of support means, a stationary way mounted on said support means, an elongated sheath having an entrance opening, means on said support means mounting said sheath in extending relation from said way with said entrance opening in adjacent relation to one end of said way, an elongated push-pull cable core extending partially in said sheath and having an end portion extending from said sheath in engagement with said way, means on said support means including a beam mounted on said support means in opposed, generally adjacent relation to said way for defining a path including a first portion extending in adjacent relation to said way from adjacent said sheath entrance opening and a second portion extending from said sheath entrance opening away from said way, a flexible elongated member movable on said path for confining said core in engagement with said way when disposed in said first path portion, means fixedly connecting the end of said core portion engaged with said way to said elongated member, and means for displacing said elongated member along said path to effect lengthwise displacement of said core within said sheath.

12. A combination in accordance with claim 11 wherein said elongated member comprises a chain and including a pair of sprockets engaged with said chain and forming components of each of said path defining means and member displacing means, one of said sprockets being disposed in tangential relation to said one end of said way and the other of said sprockets being located adjacent to the other end of said way, and said beam extending from adjacent to each of said sprockets.

13. The combination of a fixed rectilinear channel, a sheath extending from one end of said channel, a push-pull cable core disposed partially within said sheath and having an extending end portion in said channel, an elongated member, means mounting said elongated member for movement along a path having a first rectilinear portion extending in adjacent relation to said channel from said one end thereof to confine said cable core therein and a second portion extending from said one end of said channel in divergent relation to an imaginary extension of said rectilinear path portion, means anchoring the end of said cable core portion in said channel to one part of said elongated member, and means for displacing said elongated member along said path whereby, incident to movement of said elongated member, said cable core is axially displaced within said sheath.

14. A combination in accordance with claim 13 wherein said means anchoring the end of said cable core constitutes a block having a greater length than width, said block being guided by said channel for movement in the direction lengthwise of said block.

15. A combination according to claim 14 wherein said channel includes a way in which said cable core is partially disposed and a guideway for said block including a guide member disposed in spaced, opposed relation to said way, and a sliding tongue and groove connection between said block and said guide member.

16. A combination according to claim 15 wherein said elongated member includes said block and a flexible belt fixed to said block.

17. A flexible sheath, a flexible core reciprocable in the sheath and having an end projecting from the sheath, means for exerting thrust on said projecting end for advancing the core into the sheath, a way along which said end extends and on which the portion of such end externally of the sheath is stored, core-confining means movable along the way, means guiding the core-confining means for such movement and including mechanism for establishing a path for said core-confining means deviating from said way immediately adjacent the sheath, and means for moving the core-confining means concurrently with movement of the core.

18. The combination of support means, a way mounted on said support means, a push-pull cable including a sheath connected to said support means and having an entrance opening adjacent to said way and including a core displaceable linearly relative to said sheath, said core extending from within said sheath into said way, means extending from said entrance opening along said way for confining said core in said way, said core-confining means being displaceable relative to its core-confining disposition, means connecting said core to said core-confining means for effecting concurrent linear displacement thereof, means adjacent to said sheath entrance opening for progressively displacing said core-confining means from core-confining disposition at a point adjacent to said sheath entrance opening in response to linear displacement of said core and said core-confining means.

19. A combination in accordance with claim 18 wherein said means for progressively displacing said core-confining means includes a guide member and also includes means rotatably mounting one of said guide member and said way, and means for rotating one of said way and said guide member to effect linear displacement of said core relative to said way.

20. A combination in accordance with claim 18 wherein said means for progressively displacing said core-confining means includes a guide member and also includes means rotatably mounting one of said guide member and said way, and means for axially displacing said core in said sheath to effect rotatable movement of one of said way and said guide member.

21. The combination of a flexible sheath, a flexible core reciprocal in said sheath and having an end projecting from said sheath, a way along which said end extends and on which the portion of said end externally of said sheath is stored, core-confining means movable relative to said way, means guiding said core-confining means for such movement and including mechanism for establishing a path for said core-confining means deviating from said way immediately adjacent said sheath, and means for moving said core-confining means concurrently with movement of said core.

References Cited by the Examiner

UNITED STATES PATENTS

| | | | |
|---|---|---|---|
| 185,937 | 1/1877 | Leason | 74—108 X |
| 764,331 | 7/1904 | Anthony | 74—501 X |
| 1,627,697 | 5/1927 | Fredericks. | |
| 1,704,381 | 3/1929 | Caracristi. | |
| 2,276,935 | 3/1942 | Como | 74—501 X |
| 2,521,919 | 9/1950 | Johnson | 74—108 X |
| 2,690,082 | 9/1954 | Orcutt | 74—108 X |
| 2,821,092 | 1/1958 | Cordora et al. | 74—501 |
| 2,838,953 | 6/1958 | Cone | 74—501 |
| 2,947,194 | 8/1960 | Shimanckas | 74—501 |
| 3,118,321 | 1/1964 | Rinke | 74—501 X |
| 3,135,130 | 6/1964 | Bentley | 74—480 X |
| 3,160,027 | 12/1964 | Waner | 74—501 |

BROUGHTON G. DURHAM, *Primary Examiner.*

C. F. GREEN, *Assistant Examiner.*